Oct. 6, 1953 — E. H. PARSONS — 2,654,542
MOLDED PLASTIC SPOOL AND DRIVE
Filed Jan. 4, 1950
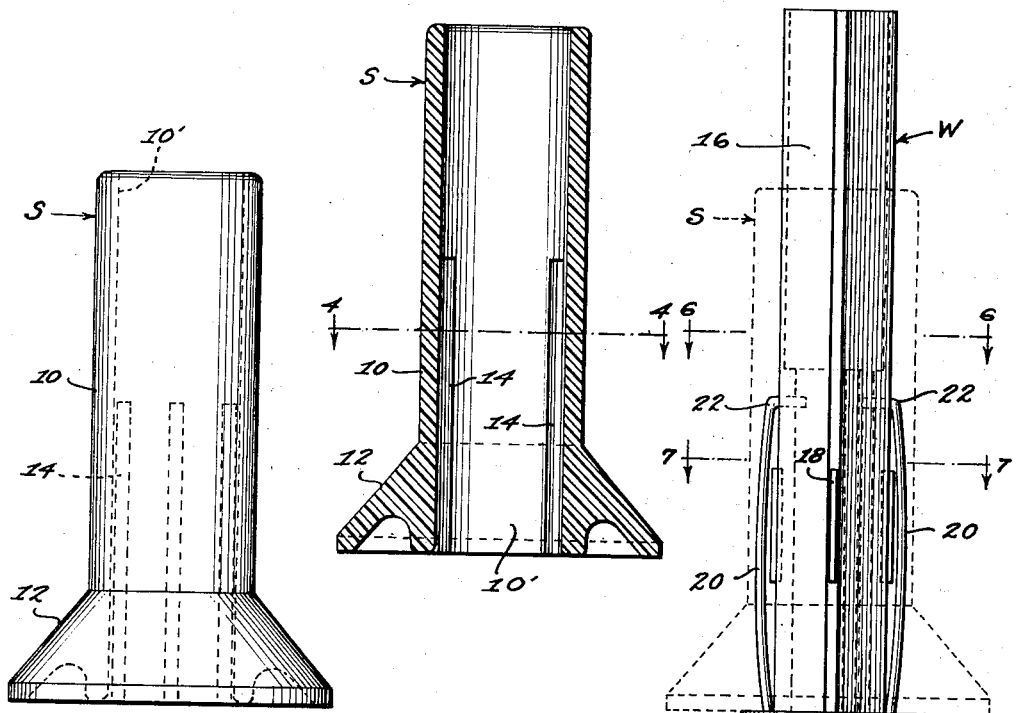
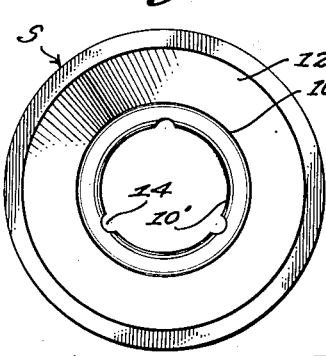
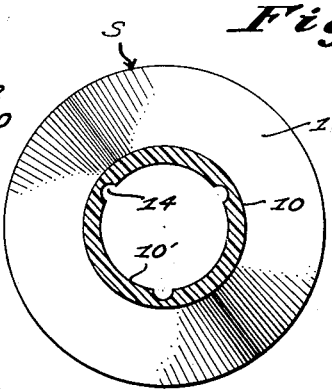
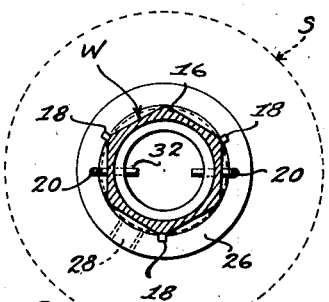
INVENTOR.
ELLIS H. PARSONS
BY
Parrott and Richards
ATTORNEYS Patented Oct. 6, 1953

2,654,542

UNITED STATES PATENT OFFICE 2,654,542

MOLDED PLASTIC SPOOL AND DRIVE

Ellis H. Parsons, Hartsville, S. C., assignor to Sonoco Products Company, a corporation of South Carolina Application January 4, 1950, Serial No. 136,752

6 Claims. (Cl. 242—46.2)

This invention relates to a molded plastic spool for carrying yarn or thread packages, and to means for adapting conventional winding devices for use with such a spool.

The use of wooden or paper spools with winding spindles which are conventionally fitted with driving blades to bite into the bore of the wood or paper spools and thereby hold them in driving engagement is well-known.

Such spools have a number of disadvantages, however, among which are the fact that they are subject easily to damage, and the fact that they are relatively difficult to manufacture. In these and other respects, plastic spools may be used much more advantageously, but a plastic spool cannot be used satisfactorily with the conventional type of winding spindle that is fitted with driving blades as mentioned above, because these driving blades mar the bore of a plastic spool unduly.

According to the present invention, a molded plastic spool is provided that is formed with longitudinal grooves in the spool bore that are adapted to receive the driving blades of a conventional winding spindle and thereby establish a driving engagement between the spool and spindle without damage to the spool. However, this arrangement for driving engagement does not secure the plastic spool longitudinally on the spindle, and means are accordingly further provided by the present invention for fitting a conventional winding spindle with spring arms arranged for maintaining a plastic spool in place.

The present invention is described further below in connection with the accompanying drawing, in which:

Fig. 1 is an elevational view of a plastic spool formed in accordance with the present invention;

Fig. 2 is a longitudinal section of the spool shown in Fig. 1;

Fig. 3 is a bottom end view of the spool shown in Fig. 1;

Fig. 4 is a sectional detail taken substantially on the line 4—4 in Fig. 2;

Fig. 5 is an elevational view of a conventional winding spindle adapted according to the present invention to receive a plastic spool such as that shown in Fig. 1;

Fig. 6 is a sectional detail taken substantially on the line 6—6 in Fig. 5; and

Fig. 7 is a further sectional detail taken substantially on the line 7—7 in Fig. 5.

Referring now in detail to the drawings and more particularly at first to Fig. 1, the molded plastic spool S of the present invention as shown is formed with a cylindrical barrel portion 10 which is tubular and thereby provides a spool bore as at 10', and a frusto-conical base 12 molded integrally with said barrel portion 10. Longitudinal grooves as at 14 are further formed interiorly of the barrel portion 10 to extend upwardly from the bottom end of the bore 10', and spaced circumferentially therein (compare Figs. 2, 3, and 4).

In Fig. 5, there is shown a conventional winding spindle W of the type having a spool-receiving shank 16 fitted with a plurality of spool-driving blades 18. As shown, the spool-receiving shank 16 is commonly of hexagonal form, and the spool-driving blades 18 are longitudinally disposed at alternate corners of the hexagonal periphery of the shank 16 intermediately of its ends. These driving blades 18 are in effect disposed on the shank 16 in the nature of splines, and as previously mentioned they are provided on the conventional type of winding spindle W to bite into the bore of a wooden or paper spool and thereby grip the spool to hold it in place on the spindle W and effect a driving engagement for winding.

But as noted above, this cannot be done with a molded plastic spool such as is provided according to the present invention without unduly marring the spool bore, and the spool S of the present invention is accordingly formed with the longitudinal grooves 14 in its bore 10' which correspond in number and are adapted to receive the driving blades 18 when a spool S is placed on the winding spindle W as indicated by dotted lines in Fig. 5. The manner in which the driving blades 18 are received by the grooves 14 is shown best in Fig. 7, in which it will be seen that this arrangement has the effect of keeping the spool S on the spindle W for winding.

However, this arrangement does not grip the plastic spool S to secure it against longitudinal slipping, and for this purpose the spindle W is further fitted with spring arms or wires 20 to maintain the spool S in place. These spring arms 20 are arranged, with an outwardly-bowed disposition, longitudinally on opposed flats of the hexagonal spool-receiving spindle shank 16. The upper ends of the spring arms 20 are angled inwardly as at 22 and are disposed or seated in suitable apertures provided in the shank 16 as illustrated in Figs. 5 and 6, while the lower ends of the spring arms 20 are disposed or seated as at 24 in longitudinal recesses provided in the shank 16 adjacent its bottom portion (see Fig. 5). To retain the spring arms 20 in place a collar 26 is removably assembled, as by a set screw 28, on the shank 16 adjacent its bottom portion to encircle the lower ends 24 of the spring arms 20. The collar 26 also serves as a bottoming shoulder for a spool S placed on the spindle W. By virtue of this arrangement it will be seen that the spring arms are disposed to grip the bore 10' of the spool S and hold it in place on the spindle W.

Plastic spools S of the particular construction described above can be readily used on a conventional winding spindle modified in this manner, and no substantial expense is incurred in adapting the conventional winding spindles for use with these plastic spools. Furthermore, the winding spindles may still be used with wooden or paper spools by simply removing the spring arms 20, which only involves loosening the set screw 28 for the collar 26 and dropping the collar 26 to release the lower ends of the spring arms 20, which are then free at their upper ends for removal.

The plastic spools S of the present invention can be molded as a complete unit which is a substantial structural advantage, and they further provide greatly improved physical properties which render them considerably more useful and durable than the ordinary wooden or paper spool.

The term "plastic" has been used above to indicate any hard-setting resinous material which may be molded to form a spool as disclosed herein. The phenol-formaldehyde, or Bakelite type, resins are familiar examples.

I claim:

1. A yarn winding device comprising a winding spindle of the type having a spool-receiving shank fitted with a plurality of spool-driving blades, a plurality of spring arms longitudinally disposed on said shank, and a removably assembled collar at the bottom of said shank for encircling said spring arms and maintaining them in place on said shank.

2. A yarn winding device comprising a winding spindle of the type having a spool-receiving shank fitted with a plurality of spool-driving blades longitudinally disposed at regular intervals around the periphery thereof, a collar removably assembled adjacent the bottom of said shank for defining the spool-bottoming shoulder, and a plurality of outwardly-bowed spring arms longitudinally disposed in opposed relation on said shank, said spring arms having their upper end portions angled inwardly and disposed in apertures in said shank, and the lower ends of said spring arms being disposed in longitudinal recesses in said shank extending underneath said collar, whereby said collar serves to maintain said spring arms in place on said shank.

3. A yarn winding device comprising a winding spindle of the type having an hexagonal spool-receiving shank fitted with three longitudinal spool-driving blades spaced at alternate corners of the hexagonal periphery thereof, a pair of outwardly-bowed spring wires positioned longitudinally along opposite flats of said shank, and a collar removably assembled at the bottom of said shank for encircling said spring wires and maintaining them in place on said shank.

4. A winding spindle of the type having an hexagonal spool-receiving shank fitted with three spool-driving blades disposed longitudinally along equally spaced hexagonal corners, a pair of bowed spring wires extending longitudinally along opposite flats of said shank from a point intermediate the ends of the spool-receiving section of said shank to a point on said spindle below the spool-bottoming point, said wires being recessed into said spindle at their terminal ends but having an intermediate portion bowed outwardly from said shank in such a way as to contact the wall of a spool placed on said spindle and prevent longitudinal slipping of said spool, and a collar removably assembled on said spindle at the lower end of said spool-receiving shank to define the spool bottoming point and to encircle the lower ends of said spring wires to maintain said wires in position.

5. The combination with a winding spindle of the type including a hexagonal spool-receiving shank fitted with three spool-driving blades disposed longitudinally at alternate hexagonal corners of said shank, of a pair of outwardly-bowed spring wires disposed longitudinally along opposite flats of said shank and maintained in place by a collar removably assembled adjacent the bottom of said shank, and a molded plastic single head spool having a cylindrical barrel formed with a bore adapted to fit said shank, the bore of said barrel being further formed with three equally spaced longitudinal grooves extending upwardly from the bottom thereof, and said grooves being adapted to receive the spool-driving blades on said shank and thereby provide for driving engagement between said spool and said shank without marring the bore of said barrel, and said bore being of uniform diameter and remaining continuous between said spaced grooves for surface contact with said spring wires for retaining said spool on said winding spindle.

6. The combination with a winding spindle of the type having a spool-receiving shank fitted with a plurality of spool-driving blades longitudinally disposed at regular intervals around the periphery thereof, of a plurality of spring arms longitudinally disposed on said shank intermediately with respect to said blades, a removably assembled collar at the bottom of said shank for encircling said spring arms and maintaining them in place on said shank, and a molded plastic single head spool having a cylindrical barrel formed with a bore adapted to fit said shank, the bore of said barrel being further formed with a plurality of spaced longitudinal grooves extending upwardly from the lower end thereof, said grooves being adapted to receive the spool-driving blades on said shank and thereby provide for driving engagement between said spool and said shank without marring the bore of said barrel, and said bore being of uniform diameter and remaining continuous between said spaced grooves for surface contact with said spring arms for retaining said spool on said winding spindle.

ELLIS H. PARSONS.

References Cited in the file of this patent

UNITED STATES PATENTS

| Number | Name | Date |
|---|---|---|
| 318,936 | Wright | May 26, 1885 |
| 362,731 | Ellis | May 10, 1887 |
| 408,396 | Tynan | Aug. 6, 1889 |
| 695,912 | Cocker | Mar. 25, 1902 |
| 1,592,784 | Smith | July 13, 1926 |
| 2,347,376 | Steinhilber | Apr. 25, 1944 |
| 2,359,604 | Atwood | Oct. 3, 1944 |
| 2,452,383 | Markle | Oct. 26, 1948 |

FOREIGN PATENTS

| Number | Country | Date |
|---|---|---|
| 444,809 | Great Britain | Mar. 27, 1936 |
| 459,094 | Great Britain | Dec. 28, 1936 |